(No Model.) 2 Sheets—Sheet 1.
H. E. DE RUFZ DE LAVISON.
VOLTAIC BATTERY.
No. 596,791. Patented Jan. 4, 1898.
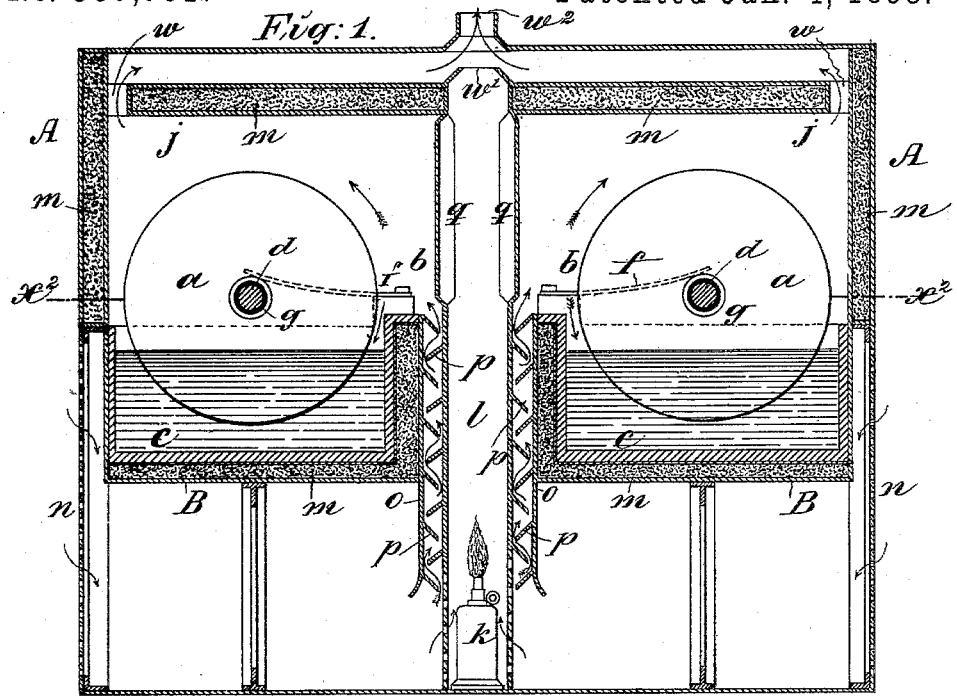
Fig: 1.
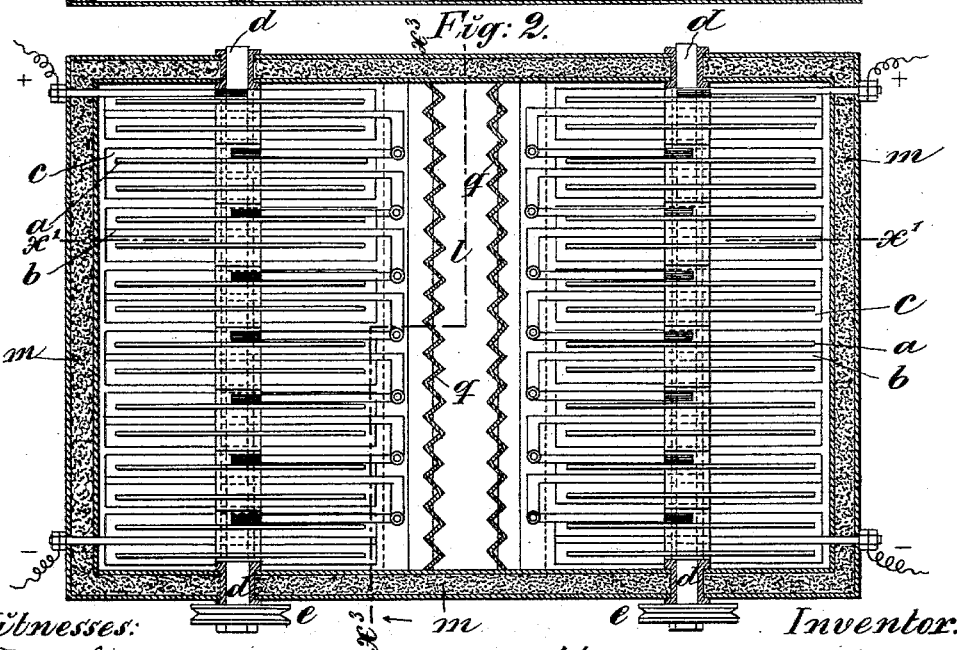
Fig: 2.
Witnesses:
Inventor:
Henri E. de Rufz de Lavison
by Henry Connett
Attorney (No Model.) 2 Sheets—Sheet 2.
H. E. DE RUFZ DE LAVISON.
VOLTAIC BATTERY.
No. 596,791. Patented Jan. 4, 1898.
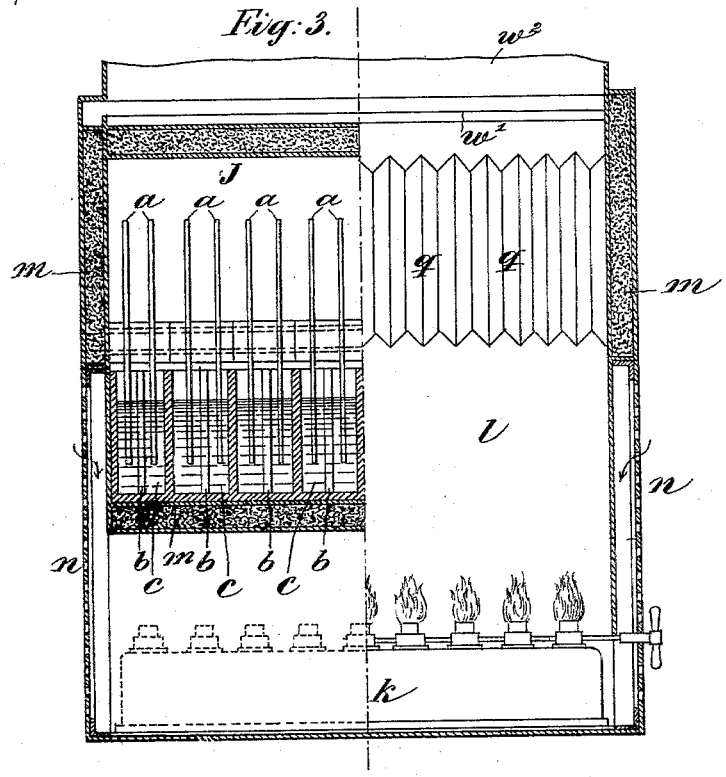
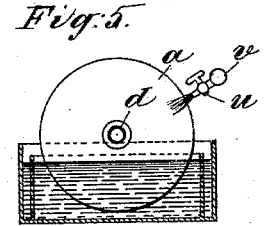
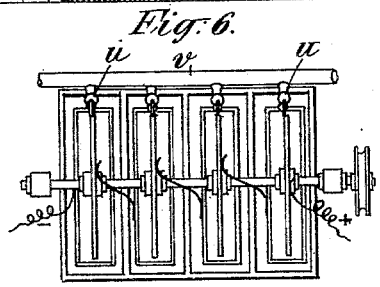
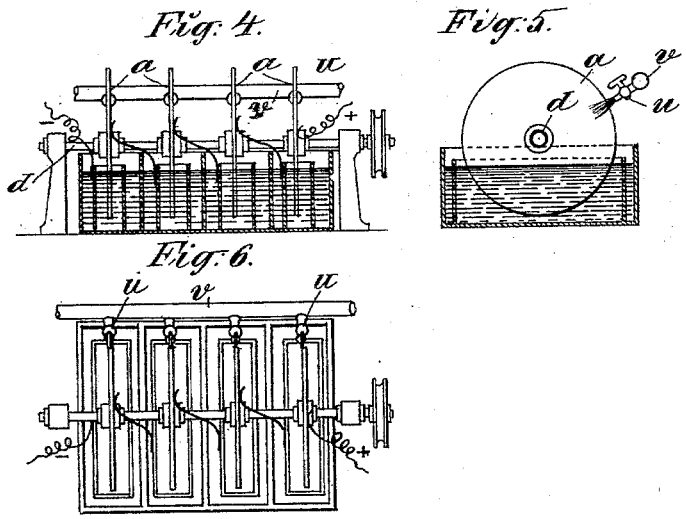
Witnesses:
Inventor:
Henri E. de Rufz de Lavison
by Henry Connett
Attorney
THE NORRIS PETERS CO., PHOTO-LITHO., WASHINGTON, D. C.

UNITED STATES PATENT OFFICE.

HENRI ETIENNE DE RUFZ DE LAVISON, OF NEUILLY-SUR-SEINE, FRANCE.

VOLTAIC BATTERY.

SPECIFICATION forming part of Letters Patent No. 596,791, dated January 4, 1898.

Application filed May 28, 1897. Serial No. 638,494. (No model.) Patented in France October 15, 1896, No. 260,469.

*To all whom it may concern:*

Be it known that I, HENRI ETIENNE DE RUFZ DE LAVISON, a citizen of the Republic of France, residing at Neuilly-sur-Seine, (Seine,) France, have invented certain new and useful Improvements in Voltaic Batteries, (for which a patent has been granted in France, No. 260,469, dated October 15, 1896,) of which the following is a specification.

This invention relates to voltaic batteries; and the object is to provide such a battery in which the depolarization of the negative electrode is effected by heat. For attaining this object in a simple and effective manner each positive electrode, composed of an oxidizable metal in the form of a disk or wheel, may be made to rotate slowly while partially submerged in a liquid electrolyte, and the air above said liquid, in which the exposed parts of the several electrodes rotate, is heated by lamps or otherwise. As the electrodes rotate slowly in the heated air they become more or less oxidized and give off their oxygen to remove the hydrogen ion as they pass through the liquid electrolyte.

In the accompanying drawings an embodiment of the invention, constructed in the manner above indicated, is illustrated.

In the drawings, Figure 1 is a vertical sectional view of the battery on line $x'$ in Fig. 2. Fig. 2 is a horizontal section substantially on line $x^2$ in Fig. 1. Fig. 3 is a vertical section substantially on the broken line $x^3$ in Fig. 2. Figs. 4, 5, and 6 illustrate a form of the battery wherein the positive electrodes are heated by a direct flame. Fig. 4 is a longitudinal vertical section, Fig. 5 a vertical transverse section, and Fig. 6 a plan.

Referring primarily to Figs. 1, 2, and 3, A represents an outer casing, which will be, by preference, formed of two casings of sheet metal, having the space between them packed with some non-conductor of heat, $m$. The lower part $n$ of this casing may be of a single thickness of metal and perforated at the sides to admit air. As herein shown, the casing A is divided transversely by two partitions into three compartments $j$, $j$, and $l$. The compartments $j\,j$ each contain a voltaic pile or battery, and the narrow central chamber $l$ contains a lamp $k$, which is supplied with air through perforations at the lower parts of the partitions. At their upper parts the partitions have or may have formed in them corrugations $q$ to aid in the radiation of heat to the compartments $j$. There are outlets $w$ for hot air in the ceilings of the compartments $j$, a similar outlet $w'$ at the top of the compartment $l$, and a main outlet $w^2$ in the top of the casing.

In each compartment $j$, adjacent to the partition, is a plate $o$ parallel therewith and forming an upright air-flue containing oblique plates $p$ to compel the air in ascending to follow a zigzag path. The arrows show the course of the air.

As stated, there is a voltaic battery in each compartment $j$. These batteries are alike and like letters of reference are employed in both. Therefore a description of one will suffice.

In a reservoir or trough B, constructed of suitable material and provided with partitions to form cells, is a liquid electrolyte $c$, and in each cell is a positive electrode $b$, which may be of zinc. Rotatively mounted in the casing A and extending over the cells is a shaft $d$, on which are fixed the negative electrodes $a$, here shown as thin circular disks of metal. Each pair of electrodes $a$ has a metal boss $g$, on which rests a metal "brush" $f$. The other end of this brush is coupled to the positive electrode of the adjacent cell. The positive and negative poles of the battery are indicated by the usual signs. On the end of the shaft $d$, exterior to the casing, is fixed a sheave $e$ for driving. It will be obvious that a slow rotary motion may be imparted to the shaft $d$ by any form of motor—for example, a small electric motor, or clockwork, or a belt from the wheel of a vehicle, if the battery be mounted on a vehicle.

The lamp $k$ heats the air about the exposed parts of the slowly-rotating negative electrodes $a$, and these latter are thus heated and superficially oxidized. They give off their oxygen in the liquid electrolyte, thus preventing polarization.

Figs. 4, 5, and 6 illustrate a construction wherein jets of gas $u$ impinge directly upon the exposed parts of the electrodes $a$ for heating them.

It will be obvious that the object sought—viz., the oxidation of the negative electrode by heat, so that polarization may be avoided— can be accomplished by many constructions and arrangements and with many forms of the negative electrode, but it has not been deemed necessary to illustrate every construction that would suggest itself. I do not limit myself in this respect to any special form, construction, or means of heating.

The lamp $k$ is not shown in Fig. 2, as it is sufficiently illustrated in the other views.

Any metal commonly employed for negative electrodes in voltaic batteries may be used in my battery, and any of the well-known liquid electrolytes may also be used. I prefer to use copper for the electrode, and for an electrolyte dilute sulfuric acid containing about five per cent. of sulfate of copper. The trough may be porcelain.

Having thus described my invention, I claim—

1. A voltaic battery comprising an electrolyte, positive electrodes immersed therein, and movable negative electrodes, of oxidizable metal in combination with means for heating the negative electrodes up to the point of oxidation, and means for raising portions of the said negative electrodes into the oxidizing atmosphere while the remainder is in the electrolyte, whereby the battery is depolarized.

2. A battery for generating an electric current, having an electrolyte, positive electrodes, negative electrodes of metal oxidizable by heat and rotatable in the electrolyte, and means for heating the portions of said negative electrodes not submerged in the electrolyte up to the point of oxidation, whereby the battery is depolarized.

3. In a battery for the generation of an electric current, the combination with a receptacle for the electrolyte, and the positive electrodes immersed in said electrolyte, of the rotatively-mounted shaft $d$, the disk-like negative electrodes $a$, of metal oxidizable by heat, fixed on said shaft and adapted to rotate and be partly immersed in the electrolyte, and means for heating the air in which the upper, exposed portions of said electrodes $a$ are exposed substantially as set forth.

4. The combination of the casing A, divided by partitions into compartments $j$, for the batteries, and an intermediate compartment $l$ the batteries in said compartment $j$, the lamp $k$, in said compartment $l$, and the ports for the hot air, said batteries being provided with rotatably-mounted negative electrodes $a$, of oxidizable metal having their lower parts only immersed on the liquid electrolyte, substantially as set forth.

In witness whereof I have hereunto signed my name in the presence of two subscribing witnesses.

HENRI ETIENNE DE RUFZ DE LAVISON.

Witnesses:
EDWARD P. MACLEAN,
AUGUSTE MATHIEU.